(12) United States Patent
Ducharme

(10) Patent No.: US 6,213,252 B1
(45) Date of Patent: *Apr. 10, 2001

(54) SOUND ABSORBING SUBSTRATE

(75) Inventor: Robert Ducharme, Ste-Anne-des-Plaines (CA)

(73) Assignee: Royal Mat International Inc., Quebec (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/747,144

(22) Filed: Nov. 8, 1996

(51) Int. Cl.⁷ .................. E04B 1/82; E04B 1/84
(52) U.S. Cl. .......................... 181/293; 181/294
(58) Field of Search .................. 181/207, 208, 181/284, 286, 293, 294

(56) References Cited

U.S. PATENT DOCUMENTS

| | | | |
|---|---|---|---|
| T931,006 | 2/1975 | Laman | 117/132 |
| 2,337,525 | * 12/1943 | Peik | 181/284 |
| 2,811,906 | 11/1957 | Chappell | 404/73 |
| 3,026,224 | * 3/1962 | Rogers, Jr. | 181/208 |
| 3,579,941 | 5/1971 | Tibbals | 52/884 |
| 3,991,848 | * 11/1976 | Davis | 181/286 |
| 4,109,041 | 8/1978 | Tellman | 428/147 |
| 4,112,176 | 9/1978 | Bailey | 428/304 |
| 4,150,850 | * 4/1979 | Doerfling | 181/284 |
| 4,492,728 | 1/1985 | Zurkinden | 428/240 |
| 4,493,471 | * 1/1985 | McInnis | 181/208 |
| 4,709,781 | * 12/1987 | Scherzer | 181/290 |
| 4,753,841 | 6/1988 | Noel et al. | 428/174 |
| 4,759,164 | 7/1988 | Abendroth | 52/403 |
| 4,867,271 | * 9/1989 | Tschudin-Mahrer | 181/290 |
| 4,910,935 | 3/1990 | Leukel | 52/302 |
| 5,014,815 | * 5/1991 | Arcas et al. | 181/213 |
| 5,016,413 | 5/1991 | Counihan | 52/391 |
| 5,110,660 | * 5/1992 | Wolf et al. | 181/208 |

FOREIGN PATENT DOCUMENTS

| | | |
|---|---|---|
| 2064403 | 10/1993 | (CA) . |
| 3020706 | 12/1981 | (DE) . |
| 4212757 | 10/1992 | (DE) . |
| 4302987 | 8/1994 | (DE) . |
| 29501727 | 6/1996 | (DE) . |
| 3505458 | 8/1996 | (DE) . |
| 2299293 | 10/1996 | (GB) . |
| 8900227 | 1/1989 | (WO) . |

\* cited by examiner

*Primary Examiner*—David M. Gray
(74) *Attorney, Agent, or Firm*—Pearson & Pearson, LLP; Walter F. Dawson

(57) ABSTRACT

A sound absorbing substrate for use as an underlayer in a flooring structure including a subfloor. The substrate is made of a resilient material and more particularly of recycled tires and comprises a bottom surface sized to cover a given surface area. This bottom surface is provided with cavities that preferably consist of parallel grooves extending at an angle of about 45° with respect to one side edge of the substrate. These cavities leave a portion only of the bottom surface in contact with the subfloor. The surface ratio of the portion of bottom surface in contact with the subfloor to the given surface area covered by the bottom surface ranges from 20 to 65%. Such substrates can be of reduced thickness while still having good sound absorbing properties.

14 Claims, 3 Drawing Sheets

SOUND ABSORBING SUBSTRATE

FIELD OF THE INVENTION

The invention relates to a sound absorbing substrate for use as an underlayer in a flooring structure of either commercial, residential or industrial building.

BACKGROUND OF THE INVENTION

The floors of the buildings or houses usually comprise a subfloor or foundation commonly made of unfinished wood or concrete, and a top floor having a visible upper finished surface. The top floor may consist of one or more layers of wood, resilient tile or sheet, ceramic tile, carpet, linoleum, etc.

It is known in the art that an intermediate layer (also called "underlayer") can be inserted between the subfloor and the top floor so as to provide resiliency and sound absorbing properties to the same. These layers are commonly manufactured as substrates that can be laid and secured onto the subfloor. In this connection reference can be made to the following U.S. patents, which disclose underlayers consisting of a uniform layer of cellular foam or rubber.

U.S. Pat. No. 2,811,906 (Chappel)

U.S. Pat. No. 3,579,941 (Tibbals)

U.S. Pat. No. 4,112,176 (Baileys)

U.S. Pat. No. 5,016,413 (Counihan)

Other documents, such as, for examples, U.S. Pat. No. 4,109,041 (Tellman) and the defensive publication U.S. T931,006 (Akron), suggest that the rubber may come from recycled used tires.

U.S. Pat. No. 4,759,164 relates to a flooring structure which comprises an underlayer made of a resilient material. The bottom surface of this underlayer is provided with spaced-out channels of a substantially U-shaped cross-section (see FIGS. 4 to 6 of it). The channels are spaced apart from one another and used as a venting system. Because of these channels, only a portion of the overall bottom surface of the underlayer is in contact with the subfloor. However, this portion represents more than 75% of the overall bottom surface.

As can be easily understood, it is desirable for the substrates used as underlayers in a flooring structure to be manufacturable at a given cost while showing good sound absorbing properties.

It is also desirable that such substrates be provided with good acoustic insulation properties while having a minimum thickness.

SUMMARY OF THE INVENTION

Accordingly, it is therefore an object of the invention to provide a method for improving sound absorbing properties of a flooring structure.

It is another object of the present invention to provide a method using a resilient substrate for improving sound absorbing properties of a flooring structure.

More particularly, the method uses is uses a sound-absorbing substrate as an underlayer in a flooring structure including a subfloor. The substrate is made of a resilient material and comprises a bottom surface sized to cover a given surface area, a top surface, and side edges. The bottom surface is provided with cavities leaving a portion only of the bottom surface in contact with the subfloor, and the surface ratio of the portion of bottom surface in contact with the subfloor to the given surface area covered by said bottom surface ranges from 15 to 65%, preferably from 20 to 50% and more preferably from 15 to 43%. It has been found that by reducing the surface in contact with the subfloor one may reduce and absorb in part the energy which is transferred by the flooring structure when sound hits the floor. Therefore the resulting sound produced on the other side of the flooring structure is reduced accordingly.

In accordance with a preferred embodiment of the invention, the resilient material may be recycled rubber, or other, and preferably consists of recycled tires.

Preferably also, the substrate has a thickness ranging between 1/64" and 3" and more particularly between 3/8" and 1".

Other objects, features and advantages of the present invention will be apparent upon reading the following non-restrictive description of a preferred embodiment thereof made with reference to the accompanying drawing.

DETAILED DESCRIPTION OF A PREFERRED EMBODIMENT

Figure 1:
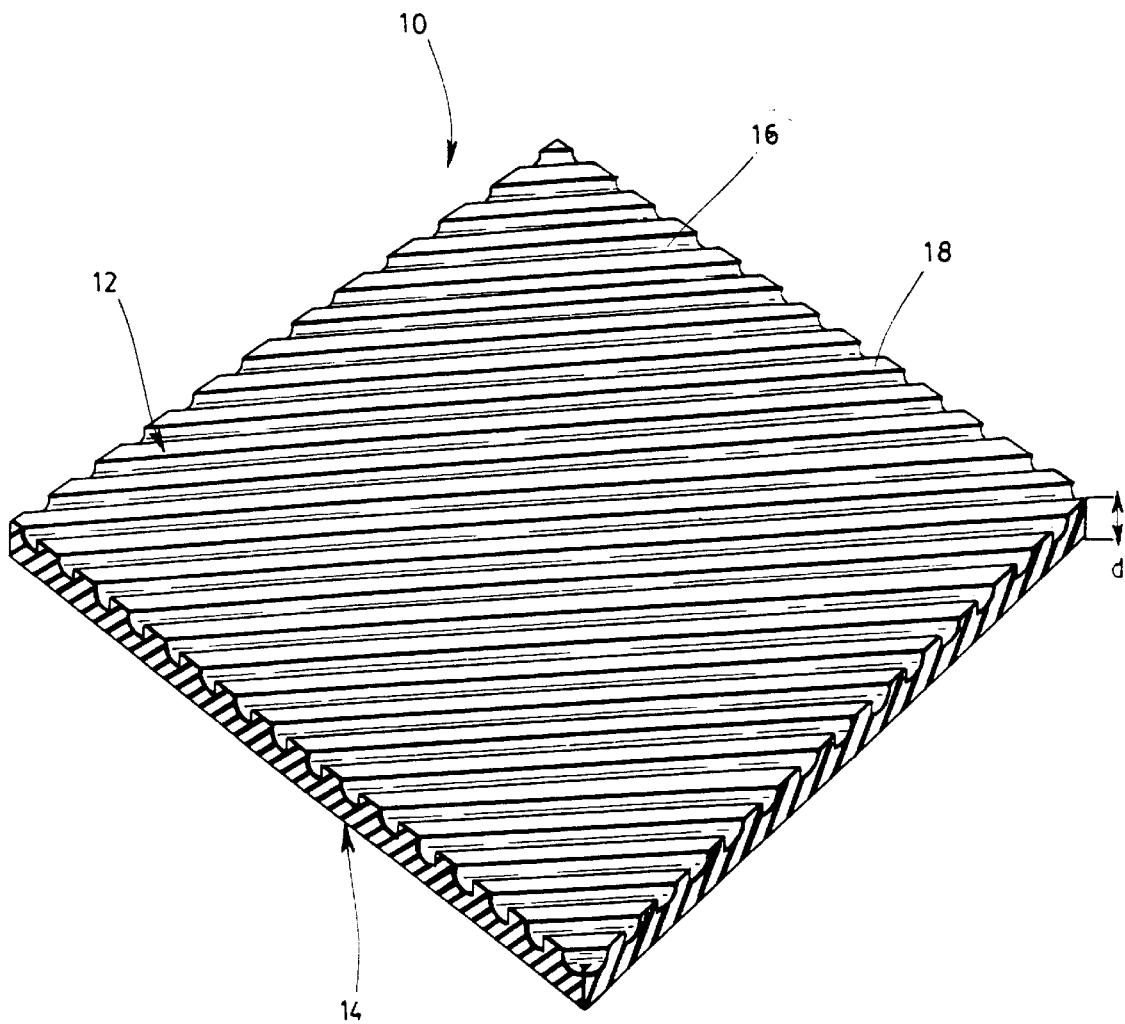
FIG. 1 is a perspective view in partial cross-section, of a substrate according to a preferred embodiment of the invention, shown in an upside down position.
Figure 2:
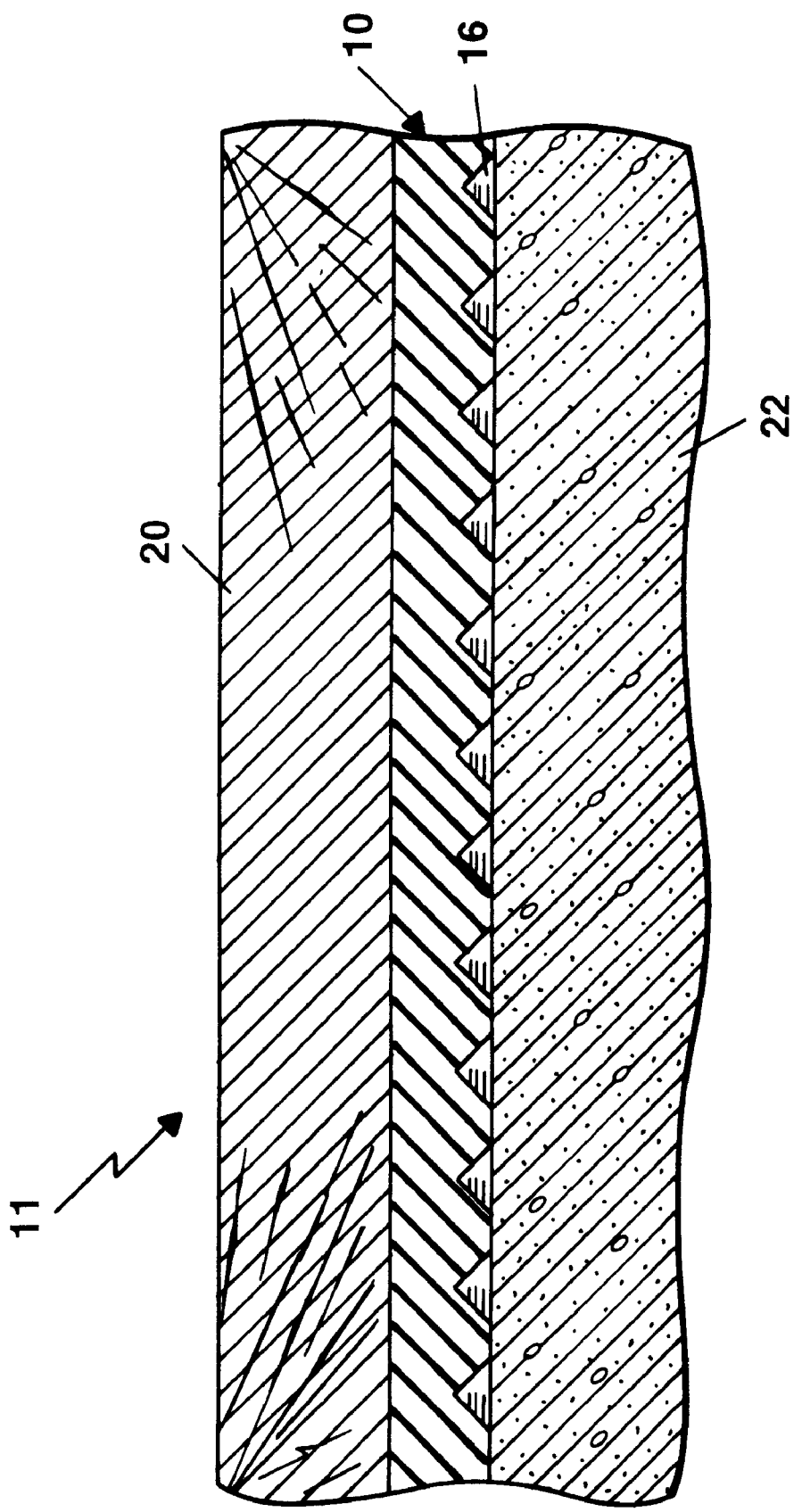
FIG. 2 is a cross-sectional view of a flooring structure incorporating a substrate similar to the one shown in FIG. 1, except that its grooves are V-shaped instead of being U-shaped.

Referring to FIG. 1 and FIG. 2 a substrate 10 according to the preferred embodiment of the invention is shown, which is made of a resilient material having good sound absorbing properties. It comprises a bottom surface 12 sized to cover a given surface area of a subfloor 22 of a flooring structure 11. It also comprises a top surface 14 and a set of side edges. These edges are preferably perpendicular to each other, thereby giving a square or rectangular shape to the substrate. However, the substrate 10 could be of another shape or could be cut to fit any particular shape and size of a given subfloor.

The bottom surface 12 is provided with cavities which consist of grooves 16, which may be parallel or non-parallel but which are preferably parallel, leaving only a portion of the bottom surface 12 in contact with the subfloor 22 when the substrate 10 is installed. In accordance with an important aspect of the invention, the surface ratio of the portion of the bottom surface 12 in contact with the subfloor 22 to the given surface area covered by this bottom surface ranges between 15 and 65%. As best shown in the drawings, the grooves 16 preferably have a U-shaped or V-shaped cross-section, thereby leaving flat surface strips 18 therebetween on the bottom surface 12.

Referring now to FIG. 2 a cross-section of the flooring structure 11 is shown taken perpendicular to the V-shaped grooves 16 of substrate 10. The substrate 10 is an underlayer laid on top and secured to the subfloor 22, and the underlayer has the same surface area as the subfloor 22. A top floor 20 is laid on top and secured to the underlayer or substrate 10.

As aforesaid, the substrate 10 is preferably made as a mat rectangular or square in shape to allow easy manufacturing and facilitate installation. In such a case, it is very desirable that the grooves 16 and strips 18 do not extend with a parallel relationship with respect to one of the side edges of the substrate 10. As shown in FIG. 1, it is preferred that the grooves 16 extend at an angle of about 45° with respect to one of the side edges of the substrate 10. As floors are usually rectangular in shape, and substrates 10 are commonly laid in parallel relationship with respect to the longest walls, such particular positions of the grooves 16 will allow all the side edges of the bottom surface 12 to be cut and present the very same shape and cross-section than any of the other portions of the substrate 10. This cannot be obtained with "parallel-to-one-of-the-edge" grooves. With these kind of grooves, the cut may take place inside or near a groove, thereby creating a fragile edge not resistant to compression, which is obviously not desirable. Although the parallel grooves 16 extending at an angle of about 45° are particularly suitable in the case of floors of rectangular shape, the grooves 16 may adopt other designs in order to fit with other particular floor shapes. Such designs may be symmetrical or non symmetrical or made of parallel or non-parallel lines like arcs of circles or concentric circles, ovals, spread out or star-shaped lines, etc. Furthermore the depth of the grooves 16 may vary and thus present an homogeneous or non homogeneous thickness.

Figure 3:
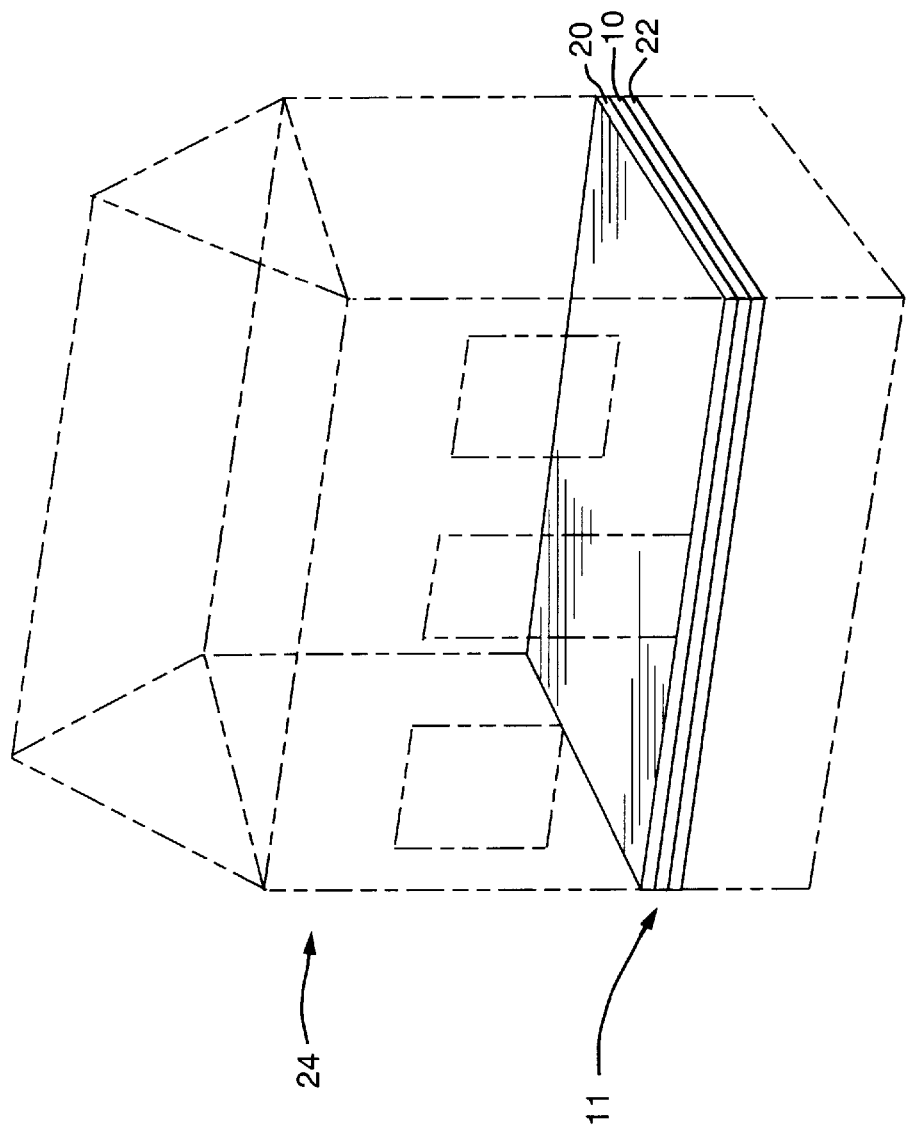
FIG. 3 is a perspective view of a house or building structure comprising the flooring structure of FIG. 1.

A suitable resilient material for the manufacture of the substrate 10 should advantageously show characteristics desirable in house and building constructions, is illustrated in FIG. 3 should be fireproof or fire retardant, waterproof, bactericide, termite resistant etc.

A particularly suitable material for the manufacturing of the substrate 10 is recycled rubber. Such rubber can be made from vulcanized particles of used tires which are thereby recycled. The granulometry of such particles is advantageously up to 2.5 mm. These particles are thermo-compressed (heat and pressure molded) and cured to shape a monolayer substrate 10 according to the invention.

The material that can be so obtained from particles of used tire or from any other component of recycled rubber, usually comprises in addition to rubber hydrocarbon, a significant content of black carbon. Depending on the origin of the rubber the material may also contain acetone extract, ash, moisture, free iron, free fabric etc.

It should be noted that the use of recycled rubber like recycled tires as starting material to preparing the substrates 10 is particularly advantageous since such products are available and present good resilient and sound absorbing qualities. Moreover, substrates manufactured with such a material present a high carbon concentration. The presence of carbon gives to the material a good thermic conductivity which gives it radiant properties and may be useful in the case of a heated floor. In this connection, the thickness of the substrate 10 may even be endowed with a network of metallic wires according to the usual and well-known technique.

The substrates 10 made from the above material were tested. Such substrates 10 presented a surface ratio of about 37%, and a thickness referenced as "d" in the figure of about ⅞". The distance between the two central axis of the two adjacent grooves 16 was equal to about 5/16". These substrates 10 showed particularly good sound absorbing properties and, more particularly, good shock-sound absorbing properties which met all the Canadian and American standards. Thus, the substrates 10 according to the invention may advantageously replace existing substrates made of the same material whose portion of the surface in contact with the ground is higher than 75% of their overall surface and whose thickness is between a third and half more.

It is worth mentioning that a large range of other materials may be used to make the substrate 10 of the invention depending on the type of flooring structure. Thus, conglomerate, composite or multi composite materials made of one or more kind of particles or fibers may advantageously be used to improve acoustical, mechanical or thermic characteristics of the substrate. These particles or fibers, organic or inorganic, may be synthetic, like plastic, or natural, like cellulose. Atomic elements like carbon may also be added in the composition of the substrate. To manufacture the substrate of the invention these particles or fibers may be thermo-compressed or embedded in a binder.

The substrate may also be provided with a top layer which may be made of fabric like polyethylene, cotton or cellulose and secured to the resilient layer with an appropriate adhesive.

As above-mentioned, the substrate 10 according to the invention is intended to be used as an intermediate layer in a flooring structure 11. The bottom surface 12 of the substrate 10 which is in contact with the subfloor 22, is usually made of concrete or wood. The substrate 10 is cut to the desired dimension and can be secured to the subfloor by means of, for example, an appropriate adhesive. This is well known in the art and does not need to be further described.

Although a preferred embodiment of the invention has been described in detail herein and illustrated in the accompanying drawings, it is to be understood that the invention is not limited to the precise embodiment and that various changes and modifications may be effected therein without departing from the scope or spirit of the invention. In particular, it can be understood that the surface ratio together with the thickness of the substrate according to the invention or the nature of the material used for its manufacture, may vary within the scope of the appended claims, depending on the structure and the nature of the subfloor, the structure of the building, the dimension of the floor, etc.

What is claimed is:

1. A method for improving sound absorbing properties of a flooring structure of a house or building, said structure including a sub-floor of given size, shape and surface area that is part of the house or building, and a top floor laid on top of said sub-floor, said top floor having the same size, shape and surface area as the sub-floor, said method comprising the steps of:

a) providing an underlayer consisting of a plurality of adjacent sound absorbing substrates each made of recycled rubber exclusively, said substrate comprising a bottom surface, a top surface and side edges, the bottom surface being provided with cavities, the top surface being flat and plane, said cavities provided in the bottom surface of the substrate comprising parallel grooves of U or V-shaped cross-sections, said grooves having ends extending to the side edges of said substrate at an acute angle;

b) cutting said underlayer to give it a size, a shape and a surface area identical to the size, shape and surface area of the subfloor and the top floor;

c) securing said underlayer between the subfloor and the top floor and wherein the cavities provided in the bottom surface of the substrate provided as said underlayer in step (a) are sized so that the portion of said bottom surface that is in contact with the subfloor represents from 15% to 65% of said given surface area.

2. The method of claim 1, wherein the cavities provided in the bottom surface of the substrate provided as said underlayer in step (a) are sized so that the portion of said bottom surface that is in contact with the subfloor represents from 20% to 50% of the given surface area.

3. The method of claim 2, wherein:

said step of cutting said underlayer comprises the step of cutting in such a manner that the parallel grooves extend at said acute angle with respect to the side edges of the substrates after each of said substrates has been cut; and said step of securing said underlayer between the subfloor and the top floor comprises the step of securing said underlayer in such a manner that the parallel grooves also extend at said acute angle with respect to side edges of said subfloor and said top floor.

4. The method of claim 3, wherein said acute angle is approximately 45°.

5. The method of claim 4, wherein said step of providing said underlayer consisting of a plurality of adjacent sound absorbing substrates made of recycled rubber exclusively comprises the step of providing said recycled rubber made of vulcanized particles of recycled tires, said particles having a granulometry of up to 2.5 mm.

6. The method of claim 5, wherein said step of providing said underlayer consisting of a plurality of adjacent sound absorbing substrates comprises the step of providing said substrates having a thickness equal to or lower than 3".

7. The method of claim 5, wherein said step of providing said underlayer consisting of a plurality of adjacent sound absorbing substrates comprises the step of providing said substrates having a thickness ranging from 3/8" to 1".

8. The method of claim 2, wherein said step of providing an underlayer consisting of a plurality of adjacent sound absorbing substrates having cavities provided in the bottom surface comprising parallel grooves comprises the step of providing each of the grooves of the substrates with a central axis and the central axis of two adjacent grooves being spaced apart at a distance of 5/16".

9. The method of claim 1, wherein:

said step of cutting said underlayer comprises the step of cutting in such a manner that the parallel grooves extend at said acute angle with respect to the side edges of the substrates after each of said substrates has been cut; and said step of securing said underlayer between the subfloor and the top floor comprises the step of securing said underlayer in such a manner that the parallel grooves also extend at said acute angle with respect to side edges of said subfloor and said top floor.

10. The method of claim 9, wherein said acute angle is approximately 45°.

11. The method of claim 10, wherein said step of providing said underlayer consisting of a plurality of adjacent sound absorbing substrates each made of recycled rubber exclusively comprises the step of providing the recycled rubber made of vulcanized particles of recycled tires, said particles having a granulometry of up to 2.5 mm.

12. The method of claim 11, wherein said step of providing said underlayer consisting of a plurality of adjacent sound absorbing substrates comprises the step of providing said substrates having a thickness equal to or lower than 3".

13. The method of claim 11, wherein said step of providing said underlayer consisting of a plurality of adjacent sound absorbing substrates comprises the step of providing said substrate having a thickness ranging from 3/8" to 1".

14. The method of claim 1, wherein said step of providing an underlayer consisting of a plurality of adjacent sound absorbing substrates having cavities provided in a bottom surface of the substrates comprising parallel grooves comprises the step of providing each of the grooves of the substrates with a central axis and the central axis of two adjacent grooves being spaced apart at a distance of 5/16".

\* \* \* \* \*